(12) United States Patent
Shaw et al.

(10) Patent No.: US 7,040,154 B2
(45) Date of Patent: May 9, 2006

(54) MOTION SENSING FOR TIRE PRESSURE MONITORING

(75) Inventors: Mark L. Shaw, Chandler, AZ (US); Richard John August, Scottsdale, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 80 days.

(21) Appl. No.: 10/827,220

(22) Filed: Apr. 19, 2004

(65) Prior Publication Data

US 2005/0229691 A1   Oct. 20, 2005

(51) Int. Cl.
*B60C 23/02* (2006.01)
*G01L 7/00* (2006.01)

(52) U.S. Cl. .................. 73/146.5; 73/146.3; 73/756

(58) Field of Classification Search ............ 73/146, 73/146.3, 146.5, 756
See application file for complete search history.

(56) References Cited

U.S. PATENT DOCUMENTS

| | | | |
|---|---|---|---|
| 3,185,869 A * | 5/1965 | Shoor | 310/315 |
| 4,117,452 A | 9/1978 | Snyder | |
| 4,210,898 A | 7/1980 | Betts | |
| 4,237,728 A | 12/1980 | Betts | |
| 4,246,567 A | 1/1981 | Miller | |
| 4,250,759 A | 2/1981 | Vago | |
| 4,384,482 A | 5/1983 | Snyder | |
| 4,472,974 A | 9/1984 | Dickson | |
| 4,504,761 A | 3/1985 | Triplett | |
| 4,510,484 A | 4/1985 | Snyder | |
| 4,991,439 A * | 2/1991 | Betts | 73/587 |
| 5,178,016 A * | 1/1993 | Dauenhauer et al. | 73/727 |
| 5,260,683 A | 11/1993 | Tanaka | |
| 5,463,374 A | 10/1995 | Mendez | |
| 5,663,496 A * | 9/1997 | Handfield et al. | 73/146.5 |
| 5,781,104 A | 7/1998 | Huang | |
| 5,889,464 A | 3/1999 | Huang | |
| 5,955,712 A | 9/1999 | Zakutin | |
| 5,963,128 A | 10/1999 | McClelland | |
| 6,175,302 B1 | 1/2001 | Huang | |
| 6,278,363 B1 | 8/2001 | Bezek | |
| 6,343,506 B1 | 2/2002 | Jones | |
| 6,438,193 B1 | 8/2002 | Ko | |

(Continued)

FOREIGN PATENT DOCUMENTS

WO    WO02/30692 A1    4/2002

OTHER PUBLICATIONS

Mark L. Shaw, "Motion Sensing Techniques and Analysis for Direct Tire Pressure Monitoring," Society of Automotive Engineers, Inc., Sensor Products Division, TSPG, SPS, MOTOROLA, Inc., pp. 1-9 (2003).

(Continued)

*Primary Examiner*—Edward Lefkowitz
*Assistant Examiner*—George P Bonanto
(74) *Attorney, Agent, or Firm*—David G. Dolezal; Daniel D. Hill

(57) ABSTRACT

A motion sensor system for a tire pressure monitoring system (TPMS) that uses a piezoelectric sensor to sense vibration as an indication of wheel motion. The TPMS uses the detected vibration to transition between operation modes. In one embodiment, the TPMS has a motion mode and a park mode, wherein the TPMS has increased activity (e.g. sampling tire pressure at a higher rate and transmitting tire pressure at a higher rate) during the motion mode than in the park mode.

30 Claims, 8 Drawing Sheets

U.S. PATENT DOCUMENTS

| | | | |
|---|---|---|---|
| 6,453,737 B1 | 9/2002 | Young | |
| 6,507,276 B1 | 1/2003 | Young | |
| 6,535,116 B1 | 3/2003 | Zhou | |
| 6,580,365 B1 | 6/2003 | Starkey | |
| 6,658,936 B1 | 12/2003 | Matsumoto | |
| 6,891,239 B1 * | 5/2005 | Anderson et al. | 257/414 |
| 2002/0075144 A1 * | 6/2002 | DeZorzi | 340/442 |
| 2004/0020291 A1 * | 2/2004 | Katsumata et al. | 73/514.32 |
| 2004/0083817 A1 * | 5/2004 | Nomura | 73/756 |
| 2005/0179530 A1 * | 8/2005 | Stewart et al. | 340/447 |

OTHER PUBLICATIONS

Mark L. Shaw, "Considerations to Improve Battery Life in Direct Tire Pressure Monitoring," Society of Automotive Engineers, Inc., Sensor Products Division, TSPG, SPS, Motorola, Inc., 10 pgs, (2002).

* cited by examiner

US 7,040,154 B2

MOTION SENSING FOR TIRE PRESSURE MONITORING

BACKGROUND OF THE INVENTION

1. Field of the Invention

This invention relates in general to tire pressure monitoring systems and more specifically to motion detection in tire pressure monitoring systems.

2. Description of the Related Art

Tire pressure monitoring systems (TPMSs) are utilized for monitoring the tire pressure of a motorized vehicle. Some TPMSs are located at the wheel and include circuitry for transmitting information to a central controller system of the motorized vehicle. Some TPMSs are battery powered, wherein the battery is required last up to 10 years.

In order to extend battery life, TPMSs may include two modes of operation, e.g. a motion mode and a park mode. In a motion mode, the TPMS may monitor tire pressure at a greater rate and/or transmit pressure readings to a central controller system at a greater rate than during the park mode. Typically, it is desired that the TPMS be in a motion mode when the vehicle is moving.

In the past, electrical mechanical motion switches and accelerometers have been utilized to provide motion detection in a TMPS. However, electrical mechanical switches may have mechanical reliability issues and may provide for an increased cost. Furthermore, such electrical mechanical switches may consume a relatively large amount of battery energy over the life of the TMPS due to pull up or pull down resistors implemented with the electrical mechanical switch.

Accelerometers have also been used for motion detection in a TMPS. Accelerometers detect motion by measuring centrifugal acceleration. However, some accelerometers consume a relatively large amount of power (e.g. as much as the pressure sensor) during operation and are relatively expensive.

Piezoelectric sensors have been used in motion detection for detecting wheel rotation, not vibration. One such device uses a physical member which makes contact with an under inflated tire, thus transferring a mechanical force to the piezoelectric sensor during each wheel rotation. A sensing system such as this has mechanical reliability issues, and can be easily damaged during tire mounting due to its proximity to the inner tire surface.

Piezoelectric sensors have also been used to detect wheel rotation by detecting gravity variations. However, these types of systems may have a poor low frequency response in the range of interest and may have a low output for ±1 G change in rotational force.

Piezoelectric sensors have also been used as accelerometers to detect the centrifugal acceleration in the rotating wheel, but there are disadvantages with these systems. Piezoelectric sensors do not effectively measure constant loads such as the centrifugal acceleration in a rotating wheel. A constant load may give a fixed charge output from the piezoelectric sensor which may dissipate quickly. To compensate for this issue, in some systems, the piezoelectric sensor is typically operated in a resonant mode which requires a circuit to drive part of the sensing structure into resonance for detection. However, this results in increased power consumption, thus negating the benefits of a motion detection system.

What is needed is improved motion detection system for a TPMS which consumes less energy.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted.

DETAILED DESCRIPTION

The following sets forth a detailed description of a mode for carrying out the invention. The description is intended to be illustrative of the invention and should not be taken to be limiting.

Figure 1:
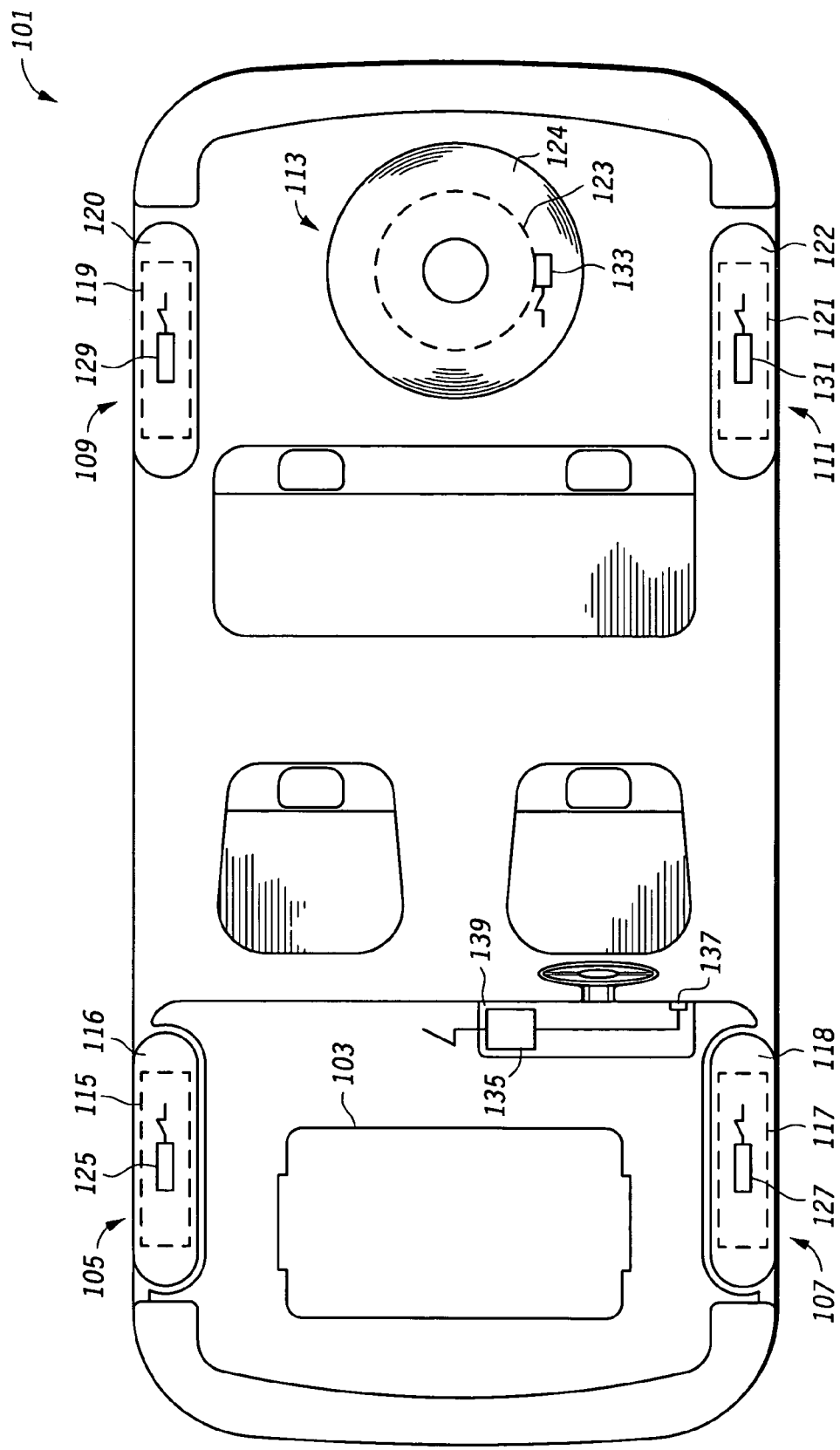
FIG. 1 is a top view of one embodiment of a motorized vehicle that implements TPMSs for monitoring tire pressure according to the present invention.

FIG. 1 is a top view of one embodiment of a motorized vehicle according to the present invention. In the embodiment shown, motorized vehicle 101 is a car with a motor 103, but may be one of another type of motorized vehicle e.g. trucks, semi trailers, SUVs, motorcycle, busses, electric vehicles, and airplanes in other embodiments.

Vehicle 101 is supported by four wheels 105, 107, 109, and 111. Each wheel includes a rim (115, 117, 119, and 121) on which a tire (116, 118, 120, and 122) is mounted. Vehicle 101 also includes a spare wheel 113 with a rim 123 and tire 124.

Each wheel of vehicle 101 includes a tire pressure monitoring system (TPMS) (125, 127, 129, 131, and 133), which in the embodiment shown is mounted to a portion of the rim of the wheel that is exposed to the internal pressurized side of the tire. Each TPMS includes a pressure sensor for measuring the air pressure of the tire. Each TPMS also includes an antenna for transmitting the pressure information to a central controller system 135 mounted in instrument panel 139.

In some embodiments, each TPMS includes a temperature sensor for measuring the temperature of the tire. With such systems, the pressure readings may be compensated for temperature effects. With some systems, temperature may be measured at a slower interval than pressure.

Controller system 135 evaluates the information received, and if the tire pressure (temperature compensated in some embodiments) of any of wheels 105, 107, 109, 111, or 113 is below a certain threshold, controller system 135 activates an indication (e.g. dash board light 137) that a tire pressure is below a particular threshold. Controller system 135 also includes a receiver (not shown).

Because it may be desirable to monitor the tire pressure more often when the vehicle is being used, each TPMS includes at least two modes of operation, a motion mode and a park mode. In one embodiment, in the motion mode, each TMPS takes a tire pressure reading at a rate of once every 15 seconds and transmits tire pressure data at a rate of once every minute. In park mode, each TMPS takes a tire pressure reading at a rate of once every 10 minutes and transmits the data at a rate of once an hour. In other embodiments, the TMPSs may take tire pressure readings and/or transmit tire pressure data at other rates. In some embodiments, the TPMS may include other modes (e.g. an interim mode). In one embodiment, the TPMS would transfer to the interim mode from a motion mode after a lack of motion detection for predetermined period of time (e.g. 30 minutes) before transferring to a park mode.

TPMSs 125, 127, 129, 131, and 133 each include a piezoelectric sensor (e.g. 205 of FIG. 2) that senses random vibration generated while the wheel is moving. Each TPMS uses the output of the piezoelectric sensor to switch between a park mode and a motion mode. A piezoelectric sensor generally includes a crystalline or polycrystalline material that generates charge when subjected to mechanical strain. Some examples of piezoelectric materials include lead zirconate titanate (PZT), quartz, and lithium niobate. Other piezoelectric materials may also be used in other embodiments.

Figure 2:
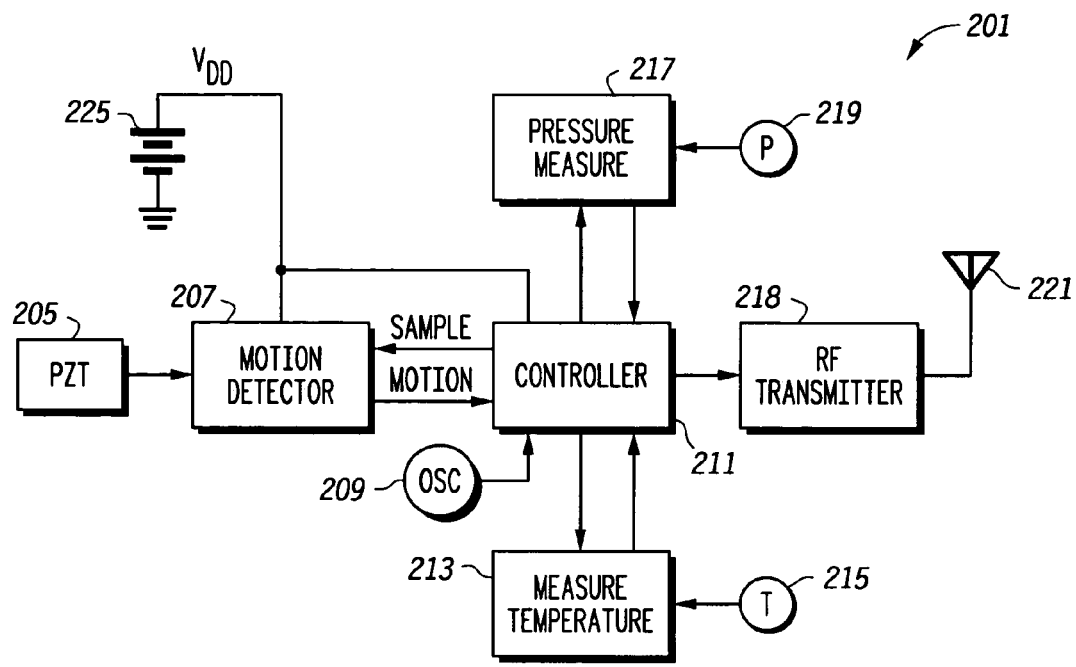
FIG. 2 is a circuit diagram of one embodiment of a TPMS according to the present invention.

FIG. 2 is a circuit diagram of one embodiment of a TPMS according to the present invention. TPMS 201 includes a piezoelectric sensor 205, a motion detector circuit 207, a controller 211, an oscillator 209, a battery 225, a pressure sensor 219, a pressure measuring circuit 217, a temperature measuring circuit 213, a temperature sensor 215, an RF transmitter 218, and an antenna 221.

In response to an assertion of a sample signal provided to circuit 217 by controller 211, circuit 217 provides a signal to controller 211 indicative of the pressure as measured by pressure sensor 219. Also, in response to a sample signal provided to circuit 213, circuit 213 provides a signal to controller 211 indicative of the temperature as measured by temperature sensor 215. In the embodiment shown, the output signals of pressure sensor 219 and temperature sensor 215 have voltage levels dependent upon the parameters being measured. The rate at which the indications of pressure and temperature are provided to controller 211 are dependent upon what mode (e.g. motion or park) TPMS 201 is operating.

TPMS 201 transmits via RF transmitter 218 and antenna 221 an indication of the tire pressure (and tire temperature in some embodiments) to a central controller system (e.g. 135). In some embodiments, the rate of the transmission of this information is also dependent upon the mode that TPMS 201 is operating.

To determine whether TPMS 201 should be in a motion mode or a park mode, TPMS 201 includes a piezoelectric sensor 205 for sensing vibration caused by a wheel rotating over a surface. Circuit 207 uses the output of piezoelectric sensor 205 to provide a MOTION signal that is indicative of wheel rotation.

Figure 3:
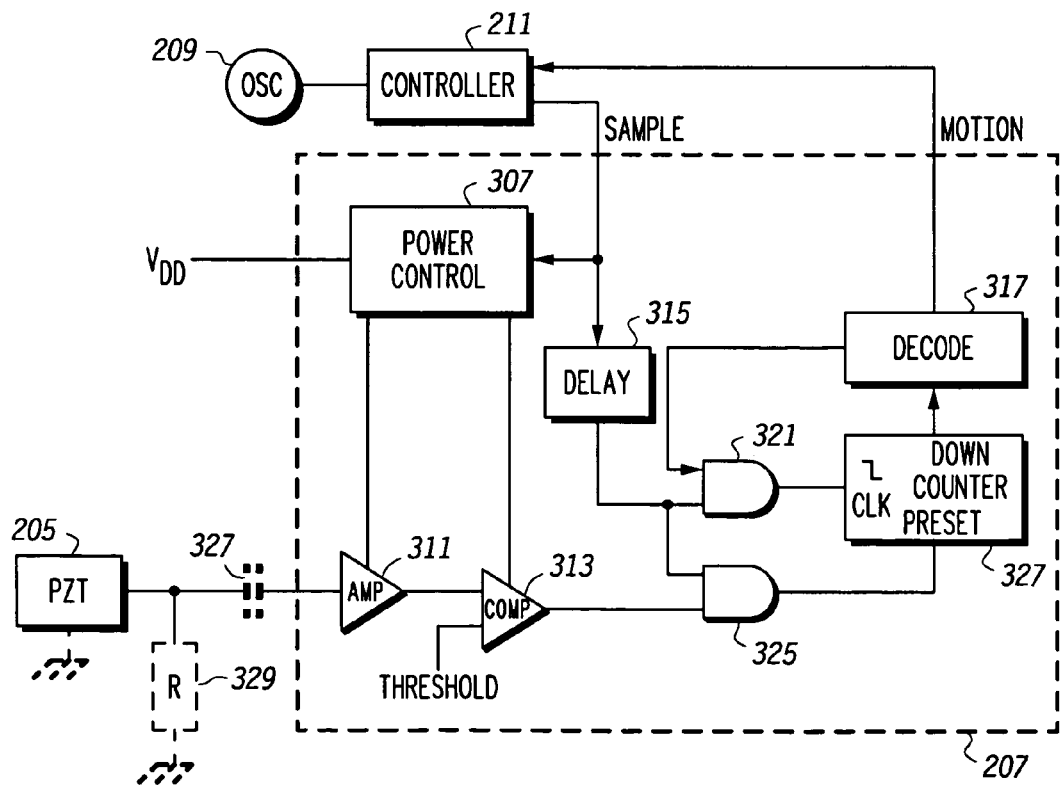
FIG. 3 is a more detailed circuit diagram of one embodiment of components of the TPMS motion detection system of FIG. 2.

FIG. 3 is a more detailed circuit diagram of one embodiment of some of the components of TPMS 201. In the embodiment shown, piezoelectric sensor 205 is coupled to circuit 207 via an optional series capacitor 327 (shown in dashed lines). Also shown in dashed lines is optional shunt resistor 329. Series capacitor 327 may be included in the TPMS to increase the sensitivity of the piezoelectric sensor output to vibration. Shunt resistor 329 maybe included to decrease the sensitivity of the piezoelectric sensor output to vibration.

Circuit 207 monitors the output of sensor 205 periodically as determined by the SAMPLE signal from controller 211 to determine whether to change the state of the MOTION signal to controller 211 based upon the output signal of the piezoelectric sensor 205. When controller 211 asserts the SAMPLE signal (e.g. at a high voltage level in one embodiment), power control circuit 307 turns on amplifier 311 which amplifies the output signal of piezoelectric sensor 205. Power control circuit 307 also turns on comparator 313 which compares the output of amplifier 311 to determine whether the output signal of piezoelectric sensor 205 indicates that sensor 205 has detected a vibration that is above a certain threshold, as indicated by the fixed THRESHOLD signal coupled to a second input of comparator 313. In one embodiment, amplifier 311 is a high input impedance amplifier with a gain of at least 100.

The output of comparator 313 is provided to AND gate 325. When the delayed SAMPLE signal from delay circuit 315 is asserted, the output of comparator 313 presets counter 327 upon the detection of a vibration above a predetermined threshold. Circuit 207 includes a decode circuit 317 that provides a MOTION signal in a state indicative of wheel rotation as long as a non zero count (for the counter in the embodiment shown) is present in counter 327. In one embodiment, decode circuit 317 provides the MOTION signal at a high voltage state even when the SAMPLE signal from controller 211 is de-asserted. The output of AND gate 321 is coupled to the clock input of counter 327 (which is falling edge triggered in the embodiment shown). AND gate 321 decrements counter 327 when the output of delay circuit 315 is at a high voltage and when the count of counter 327 is not being set to the preset value by AND gate 325.

Those of skill in the art will appreciate, that based upon the teachings herein, motion detector circuit 207 may have other configurations other than that shown. For example, circuit 207 may be implemented with an up counter instead of down counter 327. In such an embodiment, the up counter would be reset to a value of zero upon detection of a vibration by comparator 313. The MOTION signal would be placed in state indicating no motion when the counter value reaches a predetermined number (e.g. 16). Also in other embodiments, some of the functions of circuit 207 (e.g. the functions of decoder 317 and counter 327) maybe implemented by controller 211.

Figure 4:
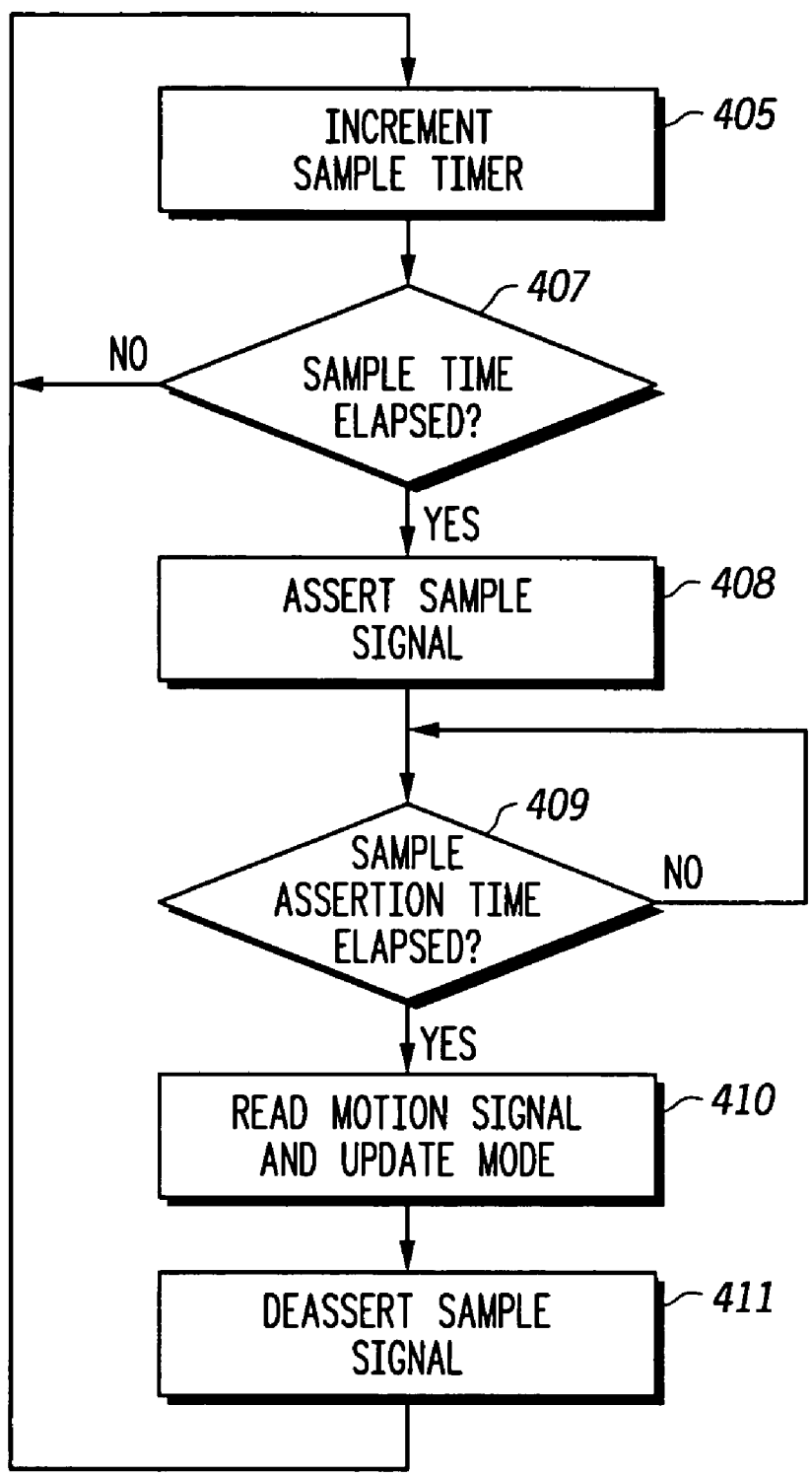
FIG. 4 is a flow diagram of one embodiment of operation a TPMS controller according to the present invention.

FIG. 4 is a flow chart of one embodiment of the operation of controller 211 of TPMS 201 according to the present invention. Controller 211 includes a sample timer counter that is incremented in 405 based on the output of oscillator 209. When the sample timer counter indicates that a predetermined period of time has elapsed in 407, controller 211 asserts the SAMPLE signal in 408. After determining that another predetermined period of time (labeled "SAMPLE ASSERTION TIME") has elapsed in 409, controller 211 reads the status of the MOTION signal from circuit 207 and updates the mode (e.g. park or motion) of TPMS 201 in response to the status of the MOTION signal in 410. In operation 411, controller 211 de-asserts the SAMPLE signal. In other embodiments, operation 411 may be performed prior to or concurrently with operation 410.

Figure 5:
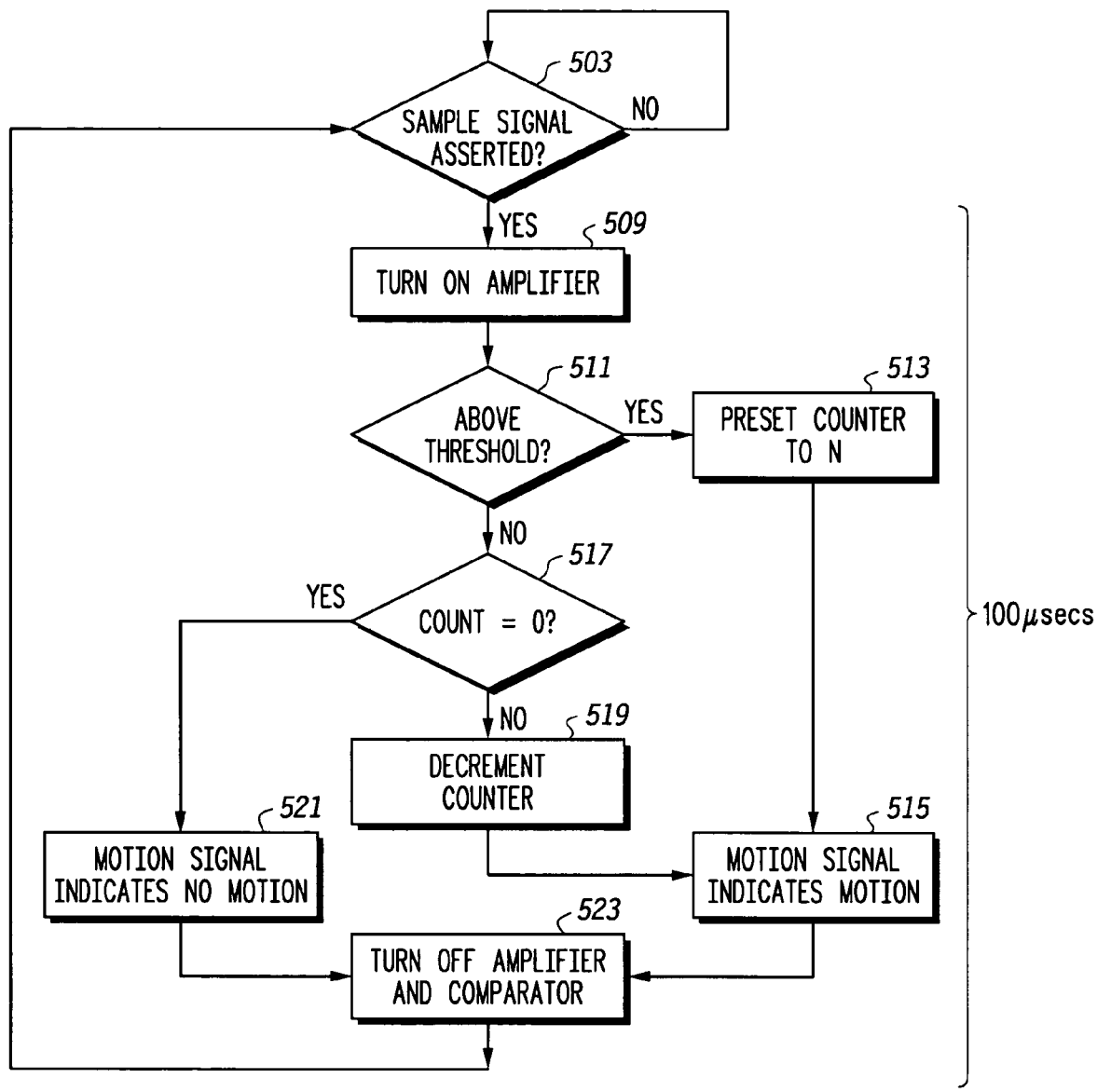
FIG. 5 is a flow diagram of one embodiment of operation a TPMS motion detector circuit according to the present invention.

FIG. 5 is a flow chart of one embodiment of the operation of motion detector circuit 207. In response to the assertion of the SAMPLE signal, amplifier 311 is turned on in 509 by power control circuit 307. If in 511 the output of amplifier 311 is above the threshold value as indicated by the THRESHOLD signal and the delayed SAMPLE signal is asserted as provided by delay circuit 315, AND gate 325 presets counter 327 to a predetermined number N (e.g. 16 in one embodiment) in 513. In response, to the output of counter 327 being above zero, decode circuit 317 in 515 provides the MOTION signal at a state (e.g. at a high voltage) indicating that the wheel is moving.

If in 511, the output of comparator 313 indicates that the output of amplifier 311 is below the threshold, and if decoder 317 indicates that the output of counter 317 is not zero and not the preset number in 517, then AND gate 321 decrements counter 327 in 519 by providing a falling edge when the delayed SAMPLE signal (as provided by delay circuit 315) is deasserted. If in 517, the output of counter 327 is zero, decoder 317 provides the MOTION signal in a state indicating no motion.

After the performance of operation 521 or 515, amplifier 311 and comparator 313 are turned off in operation 523 by power control circuit 307. In one embodiment, amplifier 311 and comparator 313 are turned off after a predetermined period of time or after the deassertion of the SAMPLE signal.

As shown by the flow chart of FIG. 5, once a vibration is indicated by comparator 313, circuit 207 will provide the MOTION signal in a state indicating wheel movement for the next N number of continuous assertions of the SAMPLE signal by controller 211 before placing the MOTION signal in a state indicating no wheel movement, provided no other vibrations are detected in those N number of SAMPLE signal assertions. Because the vibrations are random when a wheel is in motion, at any one time, no vibration may be sensed by piezoelectric sensor 205 which exceeds the threshold as provided by the output of comparator 313 even though the wheel is rotating. Accordingly, circuit 207 will not switch states if no vibration is detected at random times.

In other embodiments, the sensitivity of the motion detection system may be adjusted by changing the value of N, by changing the rate at which the SAMPLE signal is asserted, by changing the time period for which the SAMPLE signal is asserted, by changing the THRESHOLD value, by changing the gain of amplifier 311, or by changing the values of resistor 329 and capacitor 327 (if implemented). In one embodiment, the SAMPLE signal is asserted at a rate of once every 1 second. In other embodiments, the threshold voltage is set at a value to indicate a threshold wheel vibration level. The threshold voltage may also depend on other factors such as the design and sensitivity of the piezoelectric sensor, the TPMS package design, and other mechanical considerations. In some embodiments, the SAMPLE signal is asserted at one rate during the motion mode and a slower rate during a park mode.

In the embodiment shown, operations 509 to 523 in FIG. 5 are performed in about 100 micro seconds. Consequently, comparator 313 and amplifier 311 (and any other power consuming circuitry not requiring continuous power) are powered for only that time. Accordingly, the amount of energy consumed by the motion detection system over the life of a TPMS is reduced. A further advantage that may occur with TPMS 201 is that piezoelectric sensor 205 is self powering. Other advantages of utilizing a piezoelectric sensor to measure vibration for motion detection is that such a motion detection system may provide for a relatively simple, reliable, and cost effective implementation as opposed to systems that utilize electro-mechanical switches or measure acceleration or rotational speed.

In other embodiments, operations performed by controller 211 maybe performed by circuit 207 and operations performed by circuit 207 may be performed by controller 211. For example, the functions of decoder 317 and counter 327 may be performed by controller 211. Also, in other embodiments, a TPMS may operate according to different flows and may have different circuitry.

Figure 6:
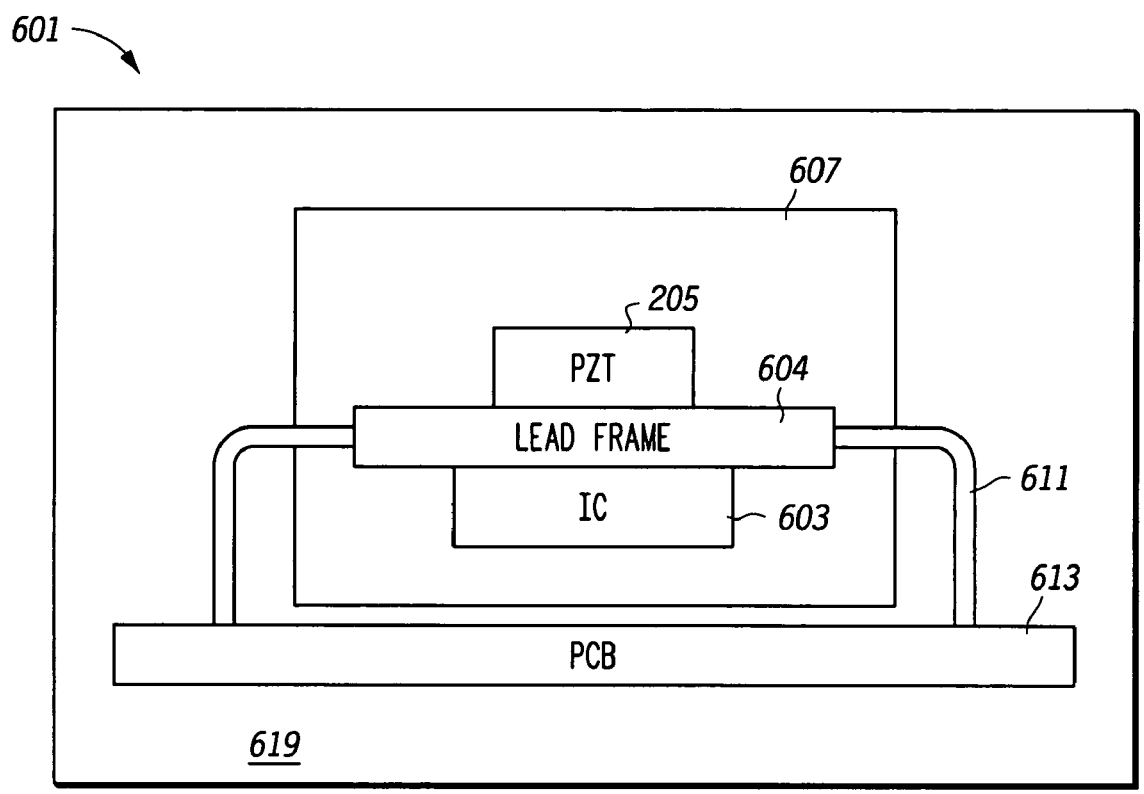
FIG. 6 is a cutaway cross sectional view of one embodiment of a device package including a TPMS according to the present invention.

FIG. 6 is a cross sectional view of one embodiment of a device package 601 that includes the TPMS of FIG. 2. In one embodiment, package 601 is mounted on the inside portion of the rim of a wheel at a location that is exposed to the pressured side of a tire.

Piezoelectric sensor 205 is encapsulated in an encapsulant 607 with a lead frame 604 and integrated circuit die 603. In the embodiment shown, piezoelectric sensor 205 is located on the opposite side of lead frame 604 from die 603. Electrical leads 611 extend from encapsulant 607. In one embodiment, IC die 603 includes controller 211, circuits 207, 213, 217, oscillator 209, and temperature sensor 215. In other embodiments, IC die 603 includes pressure sensor 219 and/or RF transmitter 218.

In one embodiment, encapsulant 607 acts to amplify the vibration measured by piezoelectric sensor 205. In some embodiments, the encapulant is an injection molded thermoplastic or an injection molded thermo set material. In one embodiment, encapsulant 607 is more elastic (e.g. has a lower Young's modulus) that the piezoelectric material. A more elastic (e.g. low Young's modulus) and/or higher density of encapsulant acts to increase the sensitivity of the piezoelectric sensor.

Leads 611 are attached to a printed circuit board 613. Also attached to the printed circuit board 613 and external to encapsulant 607 (and not shown in FIG. 6) are the antenna 221 and battery 225. In some embodiments, resistor 329 and capacitor 327 would be external to encapsulant 607.

In some embodiments, the output of piezoelectric sensor 205 is coupled to a lead of lead frame 604. That lead is coupled to a trace on circuit board 613, which is coupled to a second lead (not shown) of lead frame 604. This second lead is coupled to an input of circuit 207 of IC die 603. In other embodiments, piezoelectric sensor 205 is coupled to an input of die 603 via a structure of lead frame 604. In one embodiment, piezoelectric sensor 205 may be positioned selective to a direction of vibration (piezoelectric sensor orientation).

Encapsulant 607, antenna 221, circuit board 613, and battery 225 are encapsulated in another encapsulant 619. In some embodiments, encapsulant 619 is one of a thermo-set epoxy, a semi-rigid compound, or an elastometric compound. In one embodiment, encapsulant 619 also acts to increase the sensitivity of piezoelectric sensor 205 to vibration. An encapsulant that is more elastic (e.g. lower Young's modulus) and/or of higher density than either encapsulant 607 or the piezoelectric material of 205 acts to increase the sensitivity of the piezoelectric sensor.

In one embodiment, pressure sensor 219 is positioned in encapsulant 619 (and/or encapsulant 607) in an orientation and with a hole such that it is exposed to the internal pressure of the tire. In some embodiments, antenna 221 is located external to package 601. In other embodiments, each of piezoelectric sensor 205, die 603, battery 225, transmitter 218, pressure sensor 219, and/or antenna 221 may be separately encapsulated. Also in other embodiments, the items above maybe encapsulated in multiple packages in various combinations.

Figure 8:
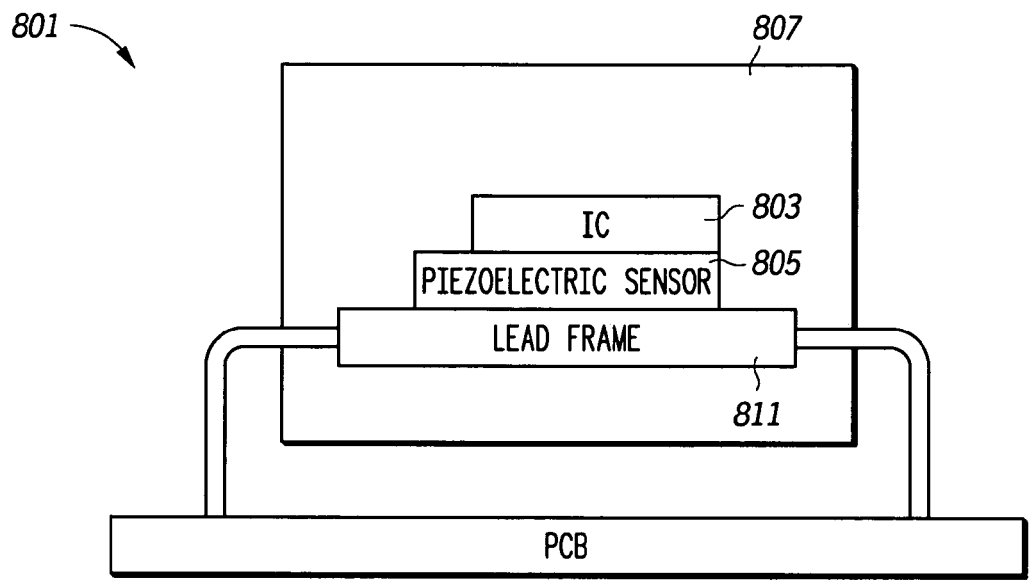
FIG. 8 is a cutaway cross sectional view of one embodiment of a device including a TPMS according to the present invention.

FIG. 8 shows another embodiment of a package 801 that includes a TPMS according to the present invention. In the embodiment shown, IC die 803 (similar to IC die 603) is stacked on top of a piezoelectric sensor 805. In this embodiment, die 803 sensor 805, and lead frame 811 are encapsulated in encapsulant 807. In this embodiment, IC die 803 can act as a mass to increase the sensitivity of piezoelectric sensor 805 to vibration. In some embodiments, package 801 shown in FIG. 8 is subsequently encapsulated in another encapsulant (not shown).

Figure 9:
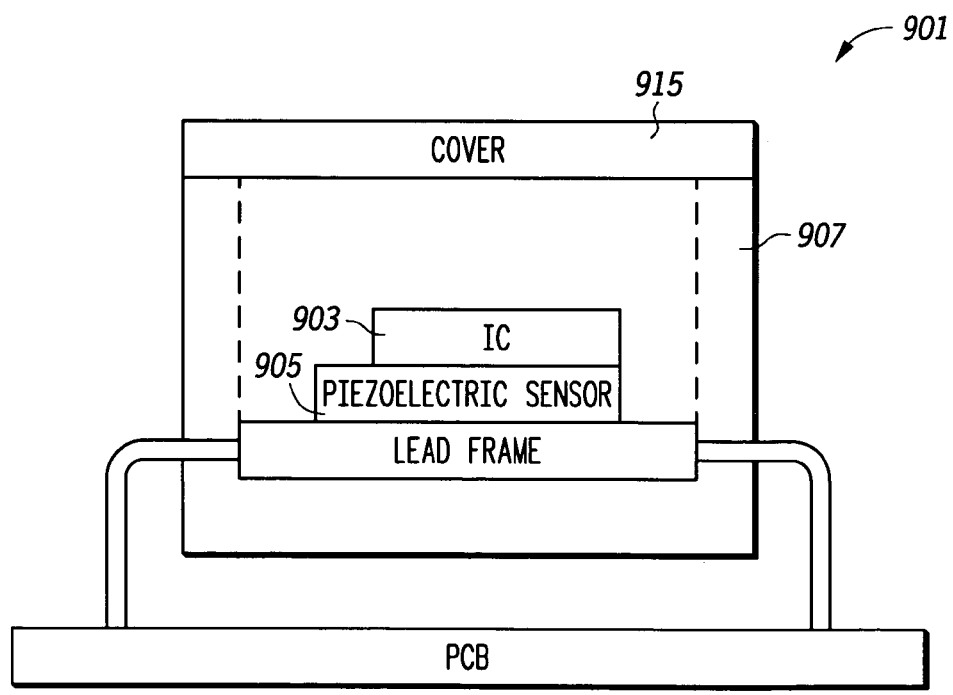
FIG. 9 is a cutaway cross sectional view of one embodiment of a device including a TPMS according to the present invention.

FIG. 9 shows another embodiment of a package 901 that includes a TPMS according to the present invention. In the embodiment shown, IC die 903 is stacked on top of the piezoelectric sensor 905. In this embodiment, encapsulant 907 does not fully cover IC die 903. In other embodiments, a separate die (not shown) including a pressure sensor is stacked on sensor 905. Die 903 can act as a mass to increase the sensitivity of the piezoelectric sensor 905 to vibration. In the embodiment shown, a cover 915 with a filter or port is located over an opening in encapsulant 907 to allow air pressure to be coupled to the pressure sensor.

Figure 10:
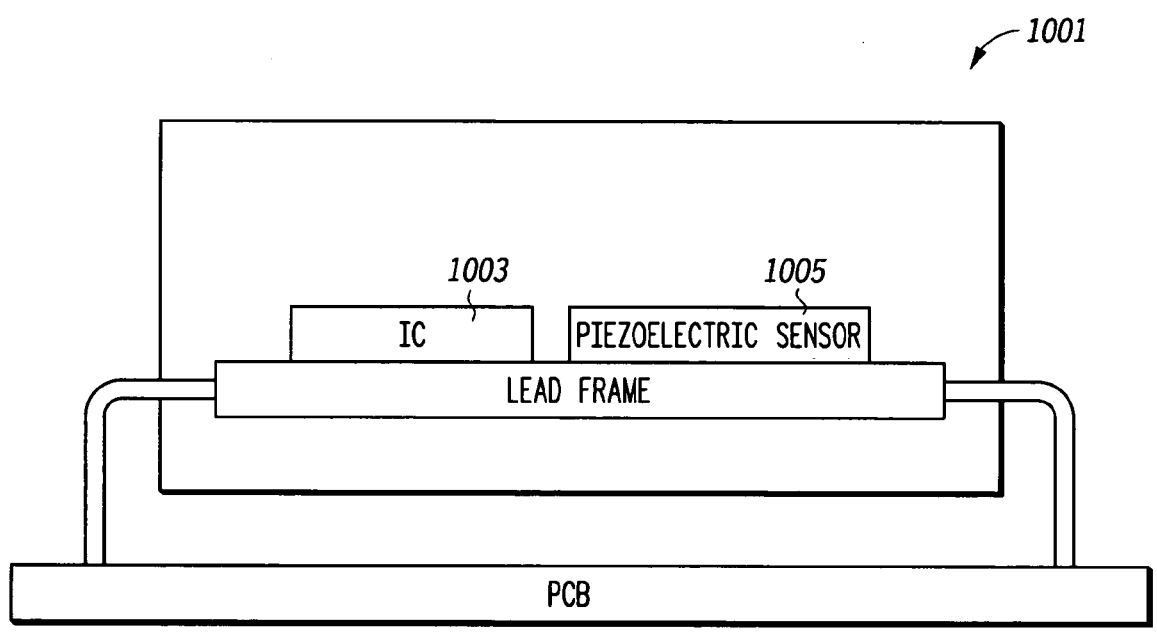
FIG. 10 is a cutaway cross sectional view of one embodiment of a device including a TPMS according to the present invention.

FIG. 10 shows another embodiment of a package 1001 that includes a TPMS according to the present invention. In this embodiment, IC die 1003 and piezoelectric sensor 1005 are located in a side by side configuration.

One advantage that may occur in using vibration sensing with a piezoelectric sensor for motion detection in a TPMS is that such a TPMS may be tested by non rotational movement. For example, such a sensor maybe tested by applying a vibration (e.g. kicking a tire) to the sensor. Furthermore, such a sensor may be tested while on the rim with no tire. In contrast, TPMSs with accelerometers for motion sensors would require rotational motion for testing. Also, unlike TPMS 201, some TPMSs with accelerometers utilize filters to filter out vibration, thereby leading to increased cost, circuit complexity, and/or power consumption.

Regarding a TPMS whose operation is set forth in FIG. 5, a mechanical shock or vibration applied to a wheel (e.g. kicking a tire) may place the TPMS in a motion mode even though the vehicle is not moving.

Figure 7:
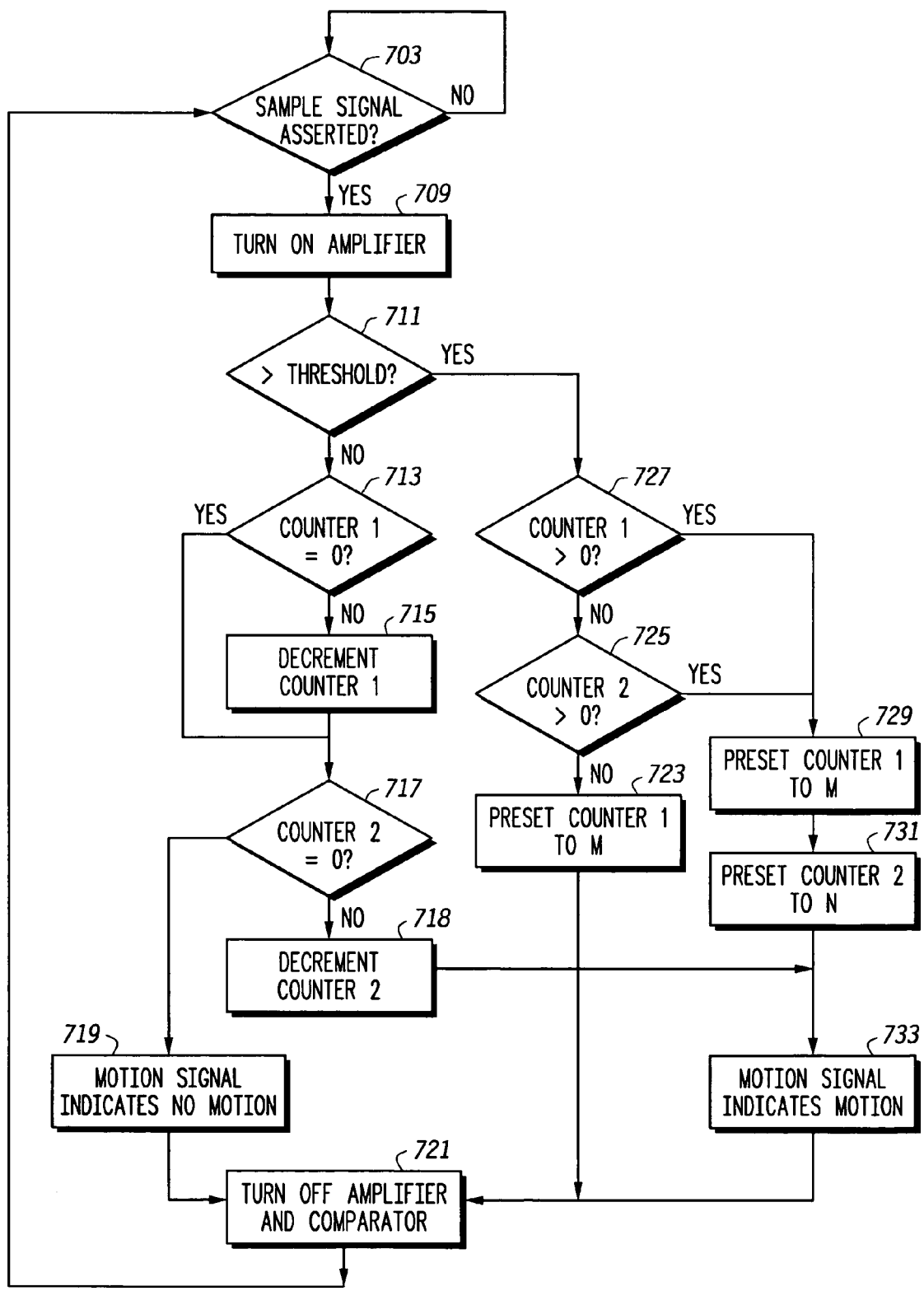
FIG. 7 is a flow diagram of another embodiment of operation a TPMS motion detector circuit according to the present invention.

FIG. 7 sets forth an alternative embodiment of operation for circuit 207. With the embodiment of FIG. 7, comparator 313 would be required to provide two indications of the detection of a vibration from two different assertions of the SAMPLE signal by controller 211 within a predetermined period of time before circuit 207 provides the MOTION signal at a state to indicate motion. Accordingly, with such an embodiment, a single vibration (such as from e.g. kicking a tire of a parked car) would not place the TPMS in a motion mode.

In some embodiments, the TPMS of the embodiment of FIG. 7 would include an extra counter in the motion detector circuit 207 (e.g. counter 1 in FIG. 7) for determining if a second vibration has been detected within a predetermined time.

Referring to FIG. 7, in response to an assertion of the SAMPLE signal from controller 211 as determined in 703, amplifier 311 (as well as comparator 313) is turned on in 709. In 711, if a vibration is detected as exceeding a threshold (e.g. if the output of comparator 313 is high) and if counter 1 is greater than 0 in 727, counter 1 is preset to value M in 729 and counter 2 is present to value N in 731. Counter 1 being at a non zero value indicates that a vibration has been detected within M previous SAMPLE signal assertions. Accordingly, in operation 733, the MOTION signal can be set to a state to indicate that a motion is detected since this detected vibration is at least the second occurrence of a vibration with in a predetermined time, and thus, the detection of motion is probably not due to a momentary vibration (e.g. kicking a tire).

Counter 1 being at zero in 727 indicates that a vibration has not been detected within the predetermined number (M) of SAMPLE signal assertions. Thus, if no in 727 and if in 725 counter 2 is greater than zero (indicating that a vibration has previously been detected within a predetermined number (N) of SAMPLE signal assertions), then counter 1 is preset to M in 729, counter 2 is preset to N in 731, and the MOTION signal is maintained in a high state in 733. Counter 2 being at a high value indicates that a vibration has been detected within N assertions of the SAMPLE signal so that the MOTION signal should not be changed from a state indicating motion.

If counter 2 is zero in 725, then only counter 1 is preset to M in 723. This condition occurs if the MOTION signal is at a state indicating no motion and a first vibration has been detected. In such a case, the MOTION signal would not be placed in a state to indicate motion due to the detection of vibration for a single assertion of the SAMPLE signal.

If in 711 no vibration is detected during the assertion of the SAMPLE signal, counter 1 is decremented in operation 715 if determined not to be at a zero value in 713. In 717, the contents of counter 2 are examined. If in 717 counter 2 has a non zero value, counter 2 is decremented in operation 718 and the MOTION signal is maintained in a state indicating motion (e.g. at a high voltage for the embodiment shown) in 733. If in 717 counter 2 has a zero value, the MOTION signal is set to a state indicating no motion (e.g. a low voltage state in the embodiment shown) in 719. After operations 719 and 733, the amplifier (e.g. 311) and comparator (e.g. 313) are turned off to conserve power.

In one embodiment, M is equal to 2 and N is equal to 16. In other embodiments, N and M may be of other values.

In other embodiments, a greater number of detections (e.g. 3 or 4) may be required before the MOTION signal is allowed to transition from a state indicating no motion to a state indicating motion. Also in other embodiments, some of the operations of FIG. 7 may be performed by controller 211.

In one embodiment, a method includes operating a tire pressure monitoring system in a first operating mode and using a piezoelectric sensor to sense vibration. The method also includes determining that an output signal of the piezoelectric sensor is above a predetermined threshold and setting the tire pressure monitoring system to a second operating mode based upon the determination that an output signal of the piezoelectric sensor is above a predetermined threshold.

In another embodiment, a tire pressure monitoring system includes a first sensor having an output for providing an indication of a sensed condition of a wheel. The tire pressure monitoring system also includes a controller and a motion detection system. The motion detection system provides a motion indication indicative of wheel rotation. The motion indication is utilized for placement of the tire pressure monitoring system in a first operating mode or a second operating mode. The motion detection system further comprises a piezoelectric sensor for sensing vibration of a wheel rotating over a surface. The piezoelectric sensor has an output to provide an output signal indicative of an amplitude of the sensed vibration. The motion detection system utilizes the output signal in providing the motion indication.

In another embodiment, a tire pressure monitoring system comprises a pressure sensor having an output for providing an indication of a sensed pressure inside a tire and a controller having an input for sampling an indication of the sensed pressure at a first sample rate during a first operating mode and for sampling an indication of the sensed pressure at a second sample rate during a second operating mode. The second rate is greater than the first rate. The tire pressure monitoring system also includes a motion detection circuit. The motion detection circuit includes a piezoelectric sensor for sensing vibration of a wheel rotating over a surface. The piezoelectric sensor has an output to provide an output signal indicative of an amplitude of the sensed vibration. The motion detection circuit also includes an amplifier having an input coupled to the output of the piezoelectric sensor and an output. The motion detection system also includes a comparator having an input coupled to the output of the amplifier. The output of the comparator providing an indication that the output signal of the piezoelectric sensor is greater than a predetermined threshold. The operating mode of the tire pressure monitoring system is based upon the comparator output.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A method comprising:
  operating a tire pressure monitoring system in a first operating mode, wherein the tire pressure monitoring system is implemented in a motorized vehicle;
  using a piezoelectric sensor to sense vibration;
  determining, using a controller, that an output signal of the piezoelectric sensor is above a predetermined threshold;
  setting the tire pressure monitoring system to a second operating mode based upon the determination that an output signal of the piezoelectric sensor is above a predetermined threshold, wherein during the first operating mode, an output of a first sensor is sampled at a first sample rate and during the second operating mode the output of the first sensor is sampled at a second sample rate, wherein the piezoelectric sensor is mounted on a lead frame and the controller is implemented in an integrated circuit die, which is stacked on top of the piezoelectric sensor, such that the integrated circuit die, acting as a mass, increases sensitivity of the piezoelectric sensor to vibrations;
  transmitting information to a controller system of the motorized vehicle at a first transmitting rate during the first operating mode, wherein the first transmitting rate is lower than the first sample rate; and
  transmitting information to the controller system at a second transmitting rate during the second operating mode, wherein the second transmitting rate is lower than the first transmitting rate and is lower than the second sample rate.

2. The method of claim 1, wherein the first sample rate is lower than the second sample rate.

3. The method of claim 1, wherein the first sensor is a tire pressure sensor.

4. The method of claim 1, wherein the first sensor is a temperature sensor.

5. The method of claim 1, wherein the piezoelectric sensor senses random vibration caused by a wheel rotating over a surface.

6. The method of claim 1, further comprising:
  setting a counter value at a first predetermined value;
  determining that the output signal is below the predetermined threshold during a sample time;
  changing the counter value in response to the determining that the output signal is below the predetermined threshold;
  determining that the counter value is a second predetermined value; and
  setting the tire pressure monitoring system to the first operating mode in response to the determining that the counter value is the second predetermined value.

7. The method of claim 1, further comprising amplifying the output signal of the piezoelectric sensor.

8. The method of claim 1 further comprising:
  amplifying the output signal of the piezoelectric sensor intermittingly, wherein the determining is performed when the output signal is being amplified.

9. The method of claim 8 wherein the amplifying is controlled by the assertion of a sample signal from the controller.

10. The method of claim 1, wherein the setting the tire pressure monitoring system to the second operating mode based upon the determination that an output signal of the piezoelectric sensor is above a predetermined threshold further includes determining that the output signal is above the predetermined threshold for at least a second occurrence within a predetermined time before setting the tire pressure monitoring system to the second operating mode.

11. The method of claim 1, wherein the piezoelectric sensor is encapsulated in an encapsulant that includes at least one of a thermo-plastic material and a thermo set material.

12. The method of claim 11 wherein the encapsulant functions to amplify the vibration sensed by the piezoelectric sensor.

13. A tire pressure monitoring system comprising:
  a first sensor having an output for providing an indication of a sensed condition of a wheel;
  a motion detection system, the motion detection system provides a motion indication indicative of wheel rotation, the motion indication is utilized for placement of the tire pressure monitoring system in a first operating mode or a second operating mode, wherein the motion detection system further comprises:
    a piezoelectric sensor for sensing vibration of a wheel rotating over a surface, the piezoelectric sensor having an output to provide an output signal indicative of an amplitude of the sensed vibration;
    wherein the motion detection system utilizes the output signal in providing the motion indication;
  a controller, wherein the controller samples an indication of the sensed condition as sensed by the first sensor at a first sample rate during the lint operating mode, and wherein the controller samples an indication of the sensed condition as sensed by the first sensor at a second sample rate during the second operating mode, wherein the second sample rate is lower than the first sample rate, wherein the piezoelectric sensor is mounted on a lead frame and the controller is implemented in an integrated circuit die, which is stacked on top of the piezoelectric sensor, such that the integrated circuit die, acting as a mass, increases sensitivity of the piezoelectric sensor to vibrations; and a transmitter operably coupled to the controller, wherein the controller initiates transmitting by the transmitter of information at a first transmitting rate during the first operating mode, wherein the first transmitting rate is lower than the first sample rate, wherein the controller initiates transmitting by the transmitter of the information at a second transmitting rate during the second operating mode, and wherein the second transmitting rate is lower than the first transmitting rate.

14. The tire pressure monitoring system of claim 13, wherein the first sensor is a pressure sensor for sensing air pressure inside a tire of a wheel.

15. The tire pressure monitoring system of claim 13, wherein the first sensor is a temperature sensor for sensing temperature inside a tire of a wheel.

16. The tire pressure monitoring system of claim 13 wherein the motion detection system further comprises:

a comparator having an input coupled to the output of the piezoelectric sensor and an output for providing an indication that the output signal of the piezoelectric sensor is greater than a predetermined threshold;

the motion indication is based upon the output or the comparator.

17. The tire pressure monitoring system of claim 16, wherein the motion detection system further comprises a counter, the counter being reset to a first predetermined value each time the comparator output indicates that the output signal of the piezoelectric sensor is greater than the predetermined threshold, the counter counting each time the comparator indicates that the output signal of the piezoelectric sensor is not greater than a predetermined threshold during an assertion of a sample signal from the controller when a count value of the counter is not a second predetermined value;

wherein the motion indication is based on the count value of the counter.

18. The tire pressure monitoring system of claim 16, wherein the motion detection system further comprises a counter, the counter counting each time the comparator indicates that the output signal of the piezoelectric sensor is not greater than the predetermined threshold during an assertion or a sample signal from the controller when a counter value of the counter is not at a predetermined value;

wherein the motion indication is at a state indicating motion when the counter value is not at the predetermined value.

19. The tire pressure monitoring system of claim 18 wherein the motion indication is at a state indicating no motion when the counter value is at the predetermined value.

20. The tire pressure monitoring system of claim 16 wherein the motion detection system further comprises:

an amplifier having an input coupled to the output of the piezoelectric sensor and an output coupled to the input of the comparator.

21. The tire pressure monitoring system of claim 13, wherein the motion detection system further comprises an amplifier having an input coupled to the output of piezoelectric sensor, the amplifier amplifying the output signal when turned on;

wherein the controller provides a sample signal;

wherein the motion detection system further includes circuitry to turn on the amplifier during an assertion of the sample signal.

22. The tire pressure monitoring system of claim 13, wherein the first operating mode is characterized as being a lower power operating mode than the second operating mode.

23. The tire pressure monitoring system or claim 13, wherein the piezoelectric sensor is made of a piezoelectric material having a first Young's Modulus, the piezoelectric sensor is encapsulated in an encapsulant having a second Young's Modulus that is more elastic than the first Young's Modulus.

24. The tire pressure monitoring system of claim 23 wherein the encapsul ant functions to amplify vibration sensed by the piezoelectric sensor.

25. A motorized vehicle including the tire pressure monitoring system of claim 13, the motorized vehicle further comprising:

a wheel including a tire, the tire pressure monitoring system physically coupled to the wheel to monitor air pressure of the tire.

26. The tire pressure monitoring system of claim 13 wherein the motion detection system further comprises a counter, the counter preventing the tire pressure monitoring system from operating in the second operating mode until after at least two samples of the output signal from the piezoelectric sensor are above a predetermined threshold within a predetermined time.

27. The tire pressure monitoring system of claim 13 wherein the motion detection system further comprises a capacitive element, coupled in series to the output of the piezoelectric sensor for increasing a sensitivity of the output signal of the piezoelectric sensor.

28. The tire pressure monitoring system of claim 13 wherein the motion detection system further comprises a shunt resistive element, coupled in parallel to the output of the piezoelectric sensor for decreasing a sensitivity of the output signal of the piezoelectric sensor.

29. The tire pressure monitoring system of claim 13 further comprising:

a controller, wherein at least some operations of the motion detection system are performed by the controller.

30. A tire pressure monitoring system comprising:

a pressure sensor having an output for providing an indication of a sensed pressure inside a tire;

a controller having an input for sampling an indication of the sensed pressure at a first sample rate during a first operating mode and for sampling an indication of the sensed pressure at a second sample rate during a second operating mode, the second sample rate being lower than the first sample rate;

a motion detection circuit, comprising:

a piezoelectric sensor for sensing vibration of a wheel rotating over a surface, the piezoelectric sensor having an output to provide an output signal indicative of an amplitude of the sensed vibration, wherein the piezoelectric sensor is mounted on a lead frame and the controller is implemented in an integrated circuit die, which is stacked on top of the piezoelectric sensor, such that the integrated circuit die, acting as a mass, increases sensitivity or the piezoelectric sensor to vibrations;

an amplifier having an input coupled to the output of the piezoelectric sensor and an output;

a comparator having an input coupled to the output of the amplifier, an output of the comparator providing an indication that the output signal of the piezoelectric sensor is greater than a predetermined threshold;

wherein the operating mode of the tire pressure monitoring system is based upon the comparator output; and a transmitter operably coupled to the controller, wherein the controller initiates transmitting by the transmitter of information at a first transmitting rate during the first operating mode, wherein the first transmitting rate is lower than the first sample rate, wherein the controller initiates transmitting by the transmitter of the information at a second transmitting rate during the second operating mode, and wherein the second transmitting rate is lower than the first transmitting rate.

* * * * *

UNITED STATES PATENT AND TRADEMARK OFFICE
CERTIFICATE OF CORRECTION

| | | |
|---|---|---|
| PATENT NO. | : 7,040,154 B2 | Page 1 of 1 |
| APPLICATION NO. | : 10/827220 | |
| DATED | : April 19, 2004 | |
| INVENTOR(S) | : Mark L. Shaw | |

It is certified that error appears in the above-identified patent and that said Letters Patent is hereby corrected as shown below:

In Column 10, Line 61, Claim No. 13:

Change "sample rate during the lint operating mode," to --sample rate during the first operating mode,--

In Column 11, Line 26, Claim No. 16:

Change "the output or the" to --the output of the--

In Column 12, Line 15, Claim No. 24:

Change "wherein the encapsul ant functions" to --wherein the encapsulant functions--

Signed and Sealed this

Twenty-ninth Day of July, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,040,154 B2 |
| APPLICATION NO. | : 10/827220 |
| DATED | : May 9, 2006 |
| INVENTOR(S) | : Mark L. Shaw |

It is certified that error appears in the above-identified patent and that said Letters Patent is hereby corrected as shown below:

In Column 10, Line 61, Claim No. 13:

Change "sample rate during the lint operating mode," to --sample rate during the first operating mode,--

In Column 11, Line 26, Claim No. 16:

Change "the output or the" to --the output of the--

In Column 12, Line 15, Claim No. 24:

Change "wherein the encapsul ant functions" to --wherein the encapsulant functions--

This certificate supersedes the Certificate of Correction issued July 29, 2008.

Signed and Sealed this

Twenty-sixth Day of August, 2008

JON W. DUDAS
*Director of the United States Patent and Trademark Office*